United States Patent [19]
Toman

[11] 3,825,929
[45] July 23, 1974

[54] COMPATIBLE SPLIT-BAND DISTANCE MEASURING METHOD AND APPARATUS

[75] Inventor: Donald J. Toman, Pleasantville, N.Y.

[73] Assignee: Tull Aviation Corporation, Armonk, N.Y.

[22] Filed: Dec. 26, 1972

[21] Appl. No.: 318,230

[52] U.S. Cl. ............................ 343/6.5 R, 343/13 R
[51] Int. Cl. ............................ G01s 9/06, G01s 9/56
[58] Field of Search ........... 343/6.5 R, 6.5 LC, 13 R

[56] References Cited
UNITED STATES PATENTS

| | | | |
|---|---|---|---|
| 3,095,564 | 6/1963 | Cartwright | 343/6.5 R X |
| 3,154,780 | 10/1964 | Burbeck et al. | 343/6.5 LC X |
| 3,246,325 | 4/1966 | Sofen et al. | 343/13 R X |
| 3,618,089 | 11/1971 | Moran, Jr. | 343/13 R |

Primary Examiner—Malcolm F. Hubler
Attorney, Agent, or Firm—Curtis Ailes

[57] ABSTRACT

L-band signals transmitted from an airborne distance measuring equipment elecit a response from a ground station in C-band. The C-band response is converted in the airborne equipment to L-band to derive a distance measurement. The utilization of unwanted response signals received by direct radiation in L-band is prevented when C-band responses are expected.

21 Claims, 7 Drawing Figures

COMPATIBLE SPLIT-BAND DISTANCE MEASURING METHOD AND APPARATUS

This invention relates to an improved distance measuring method and apparatus which is particularly useful for aircraft navigation and guidance systems, and more particularly the invention relates to radio apparatus for measuring distances which is particularly useful in conjunction with instrument landing systems for the aircraft.

The conventional distance measuring equipment for aircraft (commonly referred to as DME) operates in the frequency band from about 1,000 to 1,200 MHz (part of what are referred to as L-band frequencies). While a total of 126 different frequency channels are provided for in this band, as a practical matter, for commercial aircraft operations, a much smaller number of DME channels are commonly used because they are paired for tuning with omnirange (VOR) channels and with instrument landing system (ILS) channels. As the air lanes become more and more crowded with aircraft, the radio navigational aids channels likewise become more and more crowded.

Accordingly, it is an important object of the present invention to provide additional channels for DME, and particularly additional channels for ground station replies to DME interrogation signals from aircraft.

It is another object of the invention to provide DME reply channels in which each channel has a wider frequency band to thereby provide for a more accurate determination of distance.

Another object of the invention is to provide an improved distance measuring method and apparatus which is completely compatible with existing DME apparatus, which makes use of parts of the existing DME apparatus both on the aircraft and in the ground station, and which does not interfere with the use of the existing DME apparatus on the existing channels in the usual manner.

The problem of measuring distance is particularly important in conjunction with instrument landing systems. However, there are very few distance measuring equipments which are located precisely at airport landing strips, and virtually none are presently intended to be used for landing. The primary use of DME presently is for navigational guidance rather than for guidance on landing.

The distance measurement function for instrument landing systems is generally taken care of by two so-called radio marker beacons which provide spot checks of position at 4.5 miles from the runway (the outer marker), and 3,500 feet from the runway, (the middle marker). There are various shortcomings with these distance marker beacons. In some airport locations, it is impractical or impossible to provide both marker beacons because of lack of a suitable site for the beacon transmitter. Furthermore, even where both beacons are available, they provide only spot checks on distance during the critical instrument landing maneuver.

Accordingly, it is an important object of the present invention to provide a distance measuring method and apparatus which is adapted for use in conjunction with instrument landing systems and to provide a continuous measurement of distance remaining to touch-down along the glide path.

Another object of the invention is to provide a distance measuring method and apparatus which is particularly useful for instrument landings and which is characterized by a high degree of accuracy which is required for the purpose of anticipating the touch-down point.

Another object of the invention is to provide a distance measuring method and apparatus which is particularly adapted for use in conjunction with an instrument landing system and in which selectivity and signal strengths are enhanced by employing directional antennas for the ground stations for the distance measuring function.

Other objects and advantages of the invention will be apparent from the following description and the accompanying drawings.

In carrying out the invention, an improved radio distance measuring method is employed comprising the steps of transmitting a distance measurement interrogation signal from an aircraft in a channel of a first frequency band, receiving said interrogation signal at a ground station, transmitting a response signal from the ground station in a channel of a second frequency band, receiving said second frequency band response signal at the aircraft, converting the second frequency band response signal to a frequency within said first frequency band for processing for the distance measurement determination, and concurrently preventing the utilization of response signals received by direct radiation in said first frequency band from ground stations.

Figure 6:
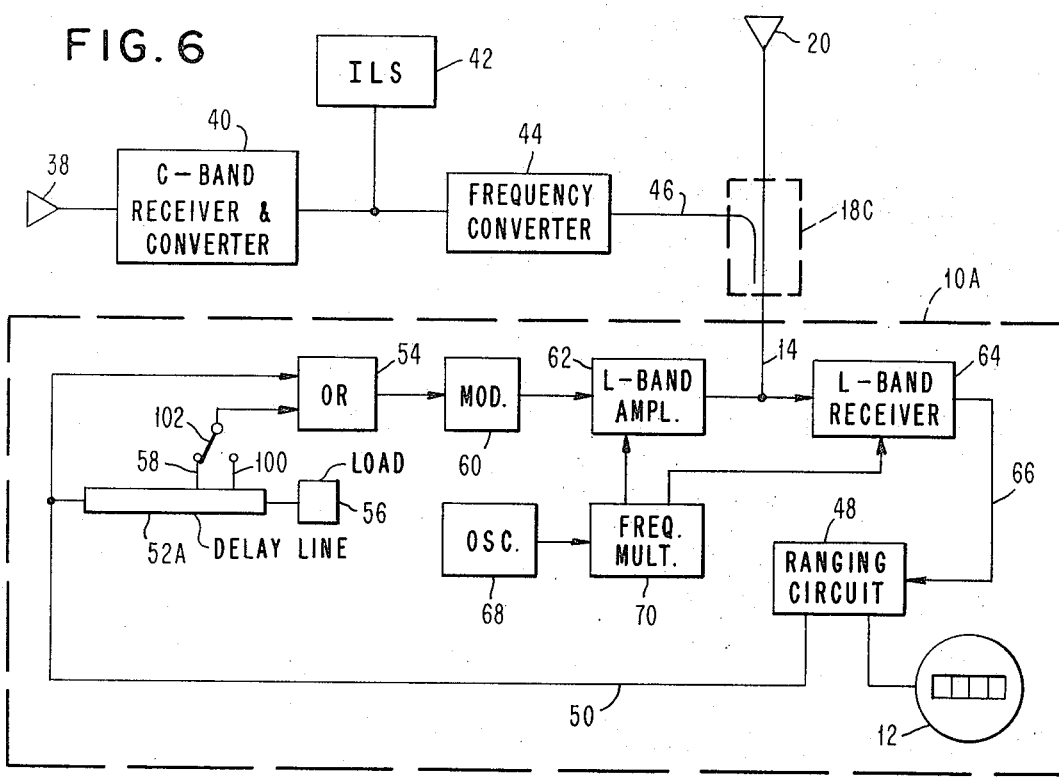
FIG. 6 is a schematic diagram of airborne equipment generally corresponding to the equipment illustrated in FIG. 1, but illustrating an alternative embodiment of apparatus for carrying out the invention.
Figure 7:
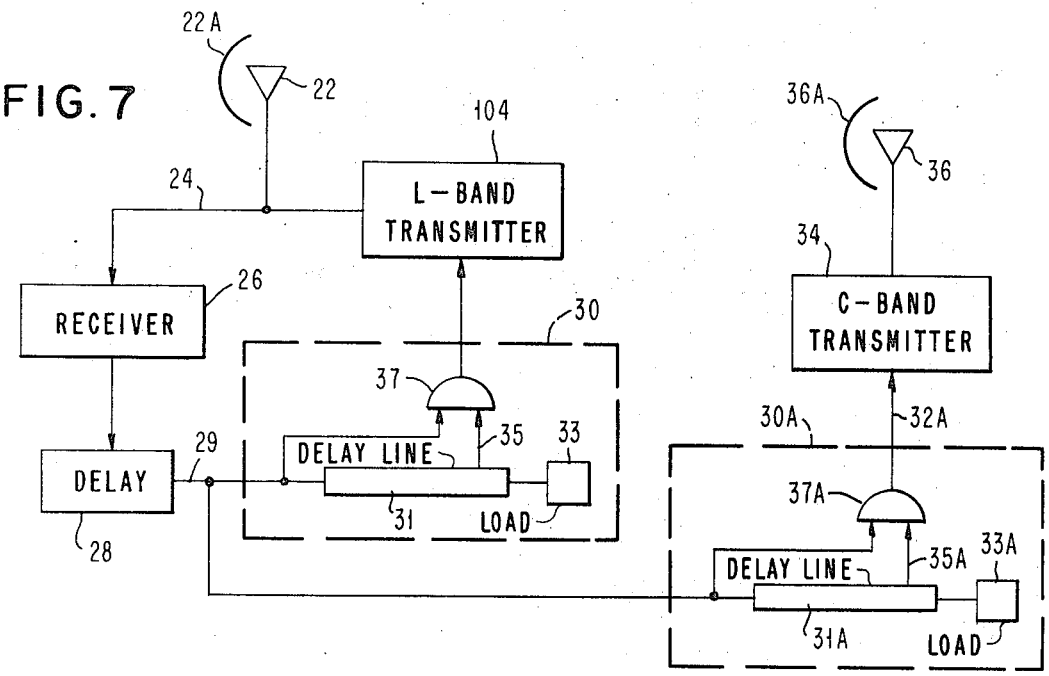

And FIG. 7 is a schematic circuit diagram of an alternative embodiment of ground station apparatus for carrying out the invention and for use in conjunction with the airborne apparatus of FIG. 6.

Figure 1:
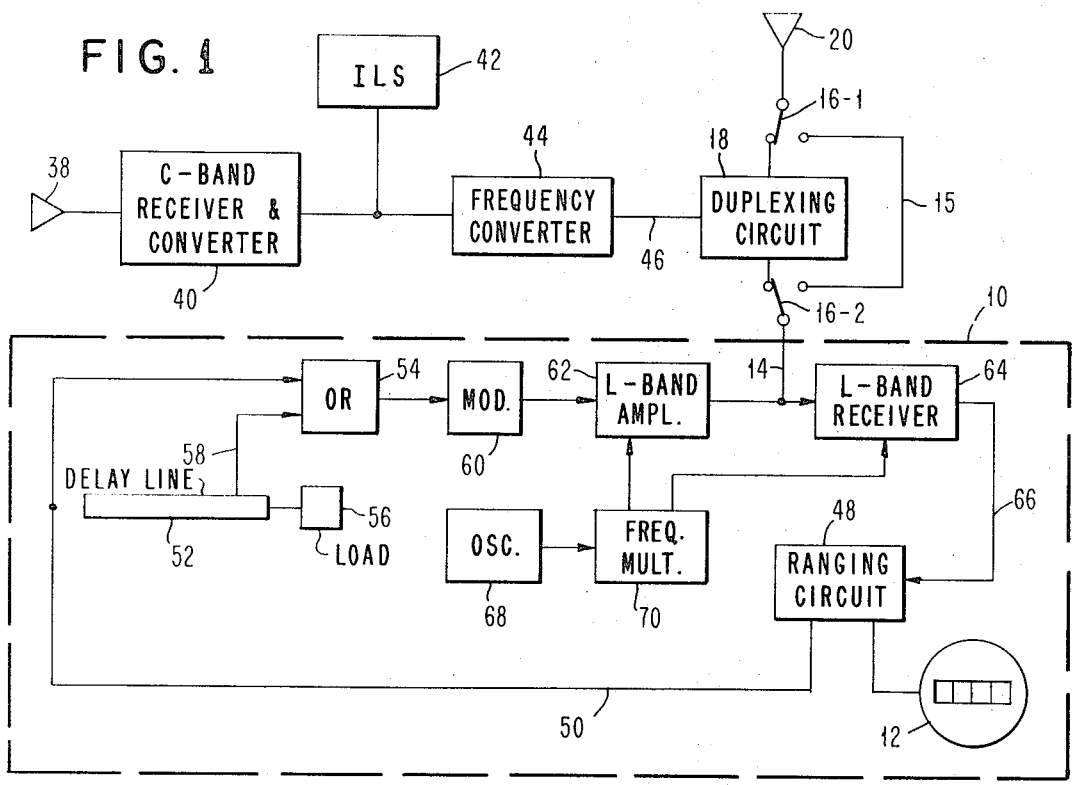
FIG. 1 is a schematic circuit diagram illustrating airborne apparatus which may be employed in carrying out the invention.

Referring more particularly to FIG. 1 of the drawings, there is shown a distance measuring equipment (DME) for installation in an aircraft, and sometimes referred to herein as an airborne distance measuring equipment. It includes an L-band transmitter-receiver 10 having a distance measurement indicating device 12. The transmitter-receiver 10 is operable to emit a pair of L-band DME interrogation pulses (two brief bursts of carrier) through an input-output antenna connection 14, and through either a duplexing circuit 18, or through a by-pass circuit 15 as controlled by ganged switches 16-1 and 16-2, to an L-band antenna 20.

When operations are to be carried out exclusively at L-band, the switches 16-1 and 16-2 are shifted from the position shown so that the duplexing circuit 18 is shunted by the by-pass circuit 15. This initial description assumes this condition. Switches 16-1 and 16-2 are schematically shown as ordinary double pole switches, but it will be understood that they are microwave switch devices.

Figure 2:
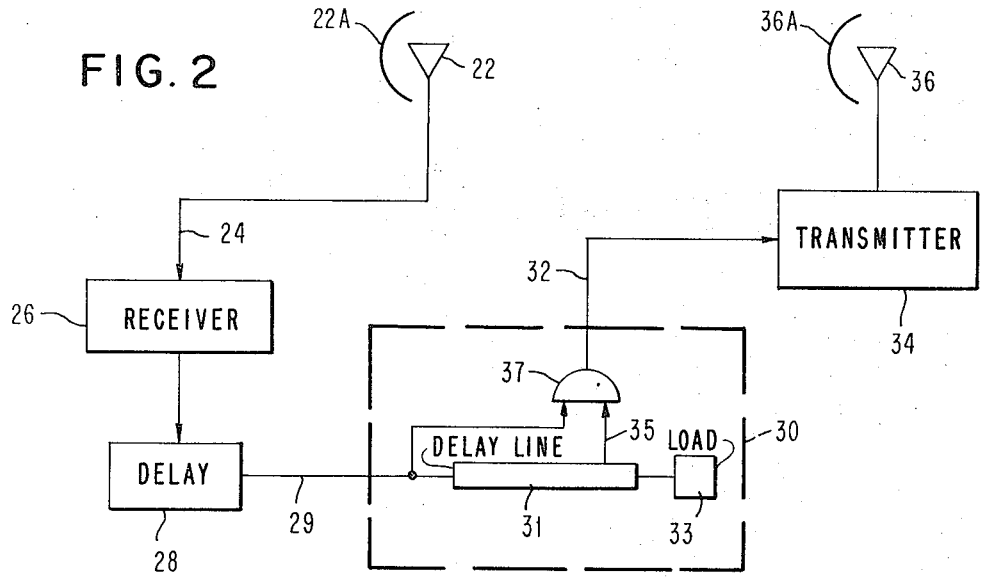
FIG. 2 is a schematic diagram of a ground station which may be employed in carrying out the invention.

FIG. 2 illustrates a ground station at which the L-band interrogation signals are received at an L-band antenna 22. These interrogation pulses are supplied through a connection 24 to a receiver 26, and the resultant demodulated output signals are then supplied to a delay device 28. There is conventionally a fifty microsecond delay between the receipt of DME interrogation signals by the ground station, and the transmission of response signals from that ground station. At least part of this delay is provided by the delay circuit 28. This standard delay period places the response signals in a predictable time slot to assist the receiver in the airborne unit (FIG. 1) to recognize and distinguish (discriminate) the desired response signals from noise and other spurious signals. Discrimination is further enhanced by operating different airborne units at unique repetition rates of the interrogation pulses and comparing responses from successive interrogations.

Referring again to FIG. 2, from the delay circuit 28, the signals are supplied at connection 29 to a pulse spacing recognition circuit 30. DME interrogation signals are usually transmitted with a pulse spacing of 12 microseconds between the two pulses. When this spacing between two successive pulses is recognized by the pulse spacing recognition circuit 30, a response is desired.

The pulse spacing recognition circuit 30 includes a delay line 31 which is terminated by a matched load 33 to prevent signal reflections. The delay line is provided with a tap 35 connected to an AND gate 37. The tap 35 is located with respect to the delay line 31 so as to provide a 12 microsecond delayed output in response to an input pulse at the input connection 29. The input pulse at connection 29 is also supplied directly to the AND gate 37. The circuit 30 operates as follows: The first pulse of the pair of interrogation pulses is supplied over connection 29 to the delay line 31 and also directly to the AND gate 37. The undelayed first pulse alone is not effective to activate AND gate 37. However, the second pulse of the pair arrives at the connection 29 and is supplied directly to the AND gate 37 at the same time that the delayed first pulse is emitted at the delay line tap 35 to the AND gate 37. Thus, the correct pulse spacing is recognized by the AND gate 37, causing the emission of an output signal on connection 32 to a transmitter 34. This results in response signals being transmitted on an antenna 36 back to the airborne equipment of FIG. 1. These response signals are received by the airborne equipment at the antenna 20, from which they are transmitted through switches 16-1, 16-2 and connections 15 and 14 to the transmitter-receiver 10, resulting in a distance measurement being registered on the indicator device 12 based upon the total elapsed time between interrogation transmission and response reception.

While the ground station of FIG. 2 is illustrated as having separate receiving and transmitting antennas 22 and 36, when both the reception and transmission at the ground station are at L-band, a common antenna is preferably employed for both transmitting and receiving.

However, in accordance with the present invention, additional channels and additional sensitivity are provided by transmitting the response from the ground station at C-band. Therefore, in accordance with a preferred form of the invention, the ground station transmitter 34 is a C-band signal transmitter, and the antenna 36 is a C-band antenna. The C-band DME responses are received at the airborne equipment of FIG. 1 by a C-band antenna 38 and a C-band receiver 40. The C-band receiver 40, in the preferred embodiment, may also serve to receive instrument landing system signals which are transmitted from the ground station at C-band frequencies. The instrument landing system equipment which is connected to receive the instrument landing system signals is schematically indicated at 42. The instrument landing system (ILS) aspect of the receiver can be carried out in accordance with the teachings of a co-pending patent application Ser. No. 247,188 filed on Apr. 24, 1972 by Donald J. Toman and Warren Hundley now U.S. Pat. 3,754,262 issued Aug. 21, 1973 for a MICROWAVE AIRCRAFT GUIDANCE SYSTEM. Further teachings relating to the ILS system, including more recent proposals for frequency allocations within the C-band for the ILS functions, are contained in another copending patent application Ser. No. 299,586 filed on Oct. 20, 1972 by Donald J. Toman for a RADIO NAVIGATIONAL AID WITH SEPARATE STANDARD FREQUENCY SIGNAL. Both of the above-mentioned patent applications are assigned to the same assignee as the present application. Both the airborne unit and the ground station are preferably implemented and embodied in a manner consistent with and compatible with, the disclosures of both of the above mentioned copending patent applications, and particularly in accordance with the specific teachings of application Ser. No. 299,586.

The C-band receiver and converter 40 includes frequency conversion means which converts the received C-band signals to the conventional ILS instrument landing frequencies. Thus, the DME signals are also converted to the ILS frequency band at the output of the receiver 40. These DME signals are further converted, in a frequency converter 44, to the conventional L-band DME frequencies for processing in the usual manner in the L-band transmitter-receiver 10. The converted signals are carried from the frequency converter 44 to the transmitter-receiver 10 through a connection 46 and a duplexing circuit 18. The duplexing circuit 18 is effective to permit the converted signals on connection 46 to be transmitted through the connection 14 to the transmitter-receiver 10. When C-band DME responses are expected from the ground station, the switches 16-1 and 16-2 are closed to the duplexing circuit 18, as shown, instead of to the bypass 15. The duplexing circuit 18 is effective to prevent transmission of unwanted L-band responses to the transmitter-receiver 10 which are received directly in L-band at antenna 20 from any DME ground station. Thus, the operation of the combined L-band interrogation C-band response DME is not interfered with by existing L-band ground station transmitters which may be triggered by interrogation signals from the airborne unit. The duplexing circuit 18 does not interfere with, or substantially attenuate, L-band interrogation signals emitted from the L-band transmitter-receiver on connection 14 through duplexing circuit 18 to the antenna 20. Thus, the duplexing circuit permits interrogation at L-band and response at C-band, while blocking, or substantially attenuating unwanted L-band responses. The details of the structure and operation of the duplexing circuit 18 are given below in conjunction with FIG. 3 of the drawings, and an alternative form of the duplexing circuit 18 is shown and described in connection with FIG. 4 of the drawings.

The transmitter-receiver 10 may preferably include a ranging circuit 48, which initiates the interrogation signals transmitted by the L-band transmitter. This is done by the emission of a pulse on a conductor 50 which is supplied to a delay line 52, and also directly to a logic "OR" circuit 54. The delay line 52 is terminated by a matched load 56 to prevent reflections of the signal initiating pulse. It is also provided with a tap 58 from which a signal is taken having a delay of 12 microseconds, the delayed signal also being connected to the "OR" circuit 54. Thus, the initiating pulse from the ranging circuit 48 is supplied to the OR gate 54 in undelayed form, and again in a 12 microsecond delayed form, and these two pulses are transmitted to a modulator 60, which in turn controls the modulation of an L-band transmitter amplifier 62 to emit two short bursts of carrier energy at the L-band to connection 14, providing the prescribed L-band interrogation signals to the ground station, as previously described above.

The response signals from the ground station, whether they are transmitted at C-band, or at L-band, are processed by an L-band receiver 64 connected to the antenna connection 14. The resultant demodulated response pulses are connected through a connection 66 back to the ranging circuit 48 where the time interval between transmission of the interrogation signal and reception of the response signal is measured, and the result is transmitted to the distance measurement indicating device 12 as a measure of distance. The transmitter-receiver includes an oscillator 68, and a frequency multiplier 70 which is connected to supply the L-band frequency for the selected channel to both the transmitter amplifier 62, and to the L-band receiver 64. The oscillator 68 is intended to include various oscillator crystals which may be selected to provide the desired L-band frequency channel.

In the preferred form of the present invention, it is intended that the C-band DME is to be employed in conjunction with an instrument landing system to provide accurate and continuous distance measurements during instrument descent for landing. For this purpose, additional signal strength and selectivity is provided by using a directional antenna for the antenna 36 of the transmitter 34 in FIG. 2. This is signified by the schematic representation of an antenna reflector dish 36A. This is in contrast to the usual DME trasmissions which are used for navigation, since reception may be required from any direction from the transmitter. Similarly, the receiver antenna 22 may likewise be a directional antenna, having greater sensitivity in the direction from which interrogation signals are expected. This directional characteristic is again signified by the schematic representation of a reflector dish 22A at the antenna 22 in FIG. 2. This directional characteristic makes the ground station more sensitive to interrogation signals which are received from the direction of approach to the landing strip which is served by the DME and the associated ILS.

The DME ground station of FIG. 2 will normally be located at the far end of the runway which it serves, that is, the end of the runway opposite to the end first approached by the aircraft which is landing. This is the usual position for the localizer ground station equipment for the instrument landing system. However, the critical distance which is to be measured by the DME is the distance from the aircraft to the point of touchdown. In accordance with the previous explanations, it is apparent that the method of distance measurement with the equipment which has been described is in terms of a measurement of the combined total intervals of transmission of the interrogation signals from the airborne equipment to the ground station, and of transmission of response signals from the ground station back to the airborne equipment. A 50 microsecond delay is added to these intervals in the ground station, and then subtracted in the airborne equipment to provide a distance measurement. In accordance with the present invention, the delay provided by the delay device 28 of the ground station is adjusted (reduced) to make it appear as though the ground station is located at the point of touch-down, a shorter distance from the aircraft, rather than at its true position at the far end of the runway. This adjustment permits considerable flexibility in the actual positioning of the DME ground station, and serves to accommodate for runways having various lengths. Thus, if the airborne DME equipment is properly calibrated, the distance measurement will always indicate the distance to touch-down at any airport equipped with DME equipment in accordance with the present invention. Since the DME is to be used primarily for landing service, this feature does not inconvenience anyone. Furthermore, if the DME is used for navigation purposes, the minor error introduced by this adjustment of the time delay is not usually serious for those purposes.

Alternatively, the DME ground station may be designed to accurately measure actual distance to the far end of the runway so as to be usable in assisting the pilot in finding his way in taxiing after touch-down, and in avoiding an overrun of the runway.

Figure 3:
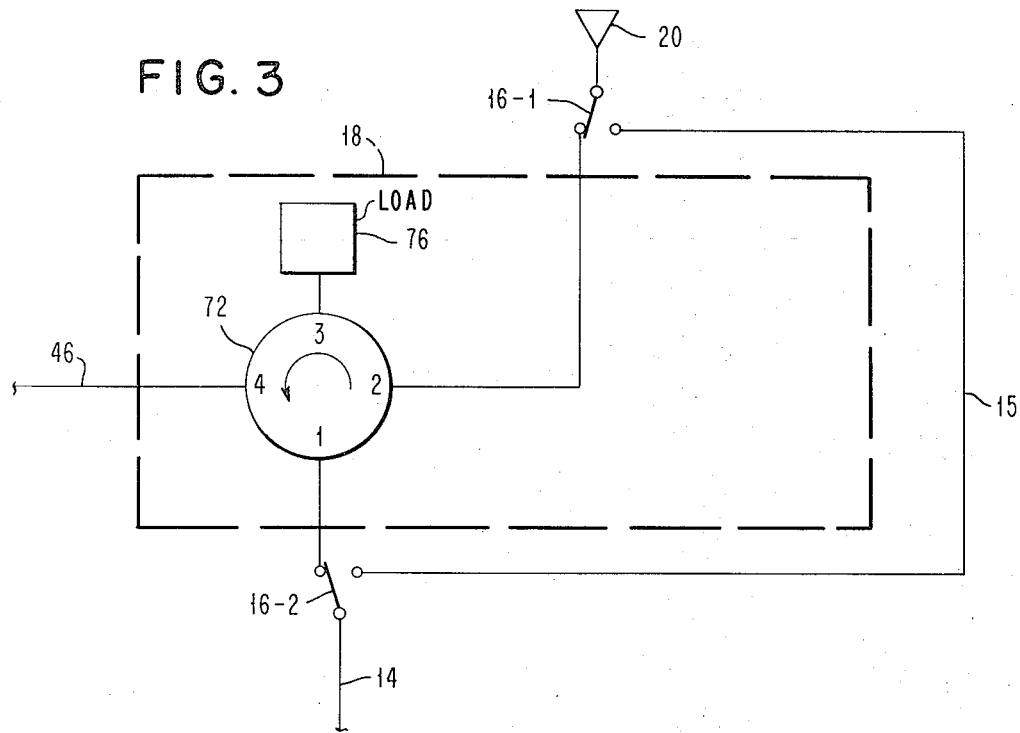
FIG. 3 is a schematic circuit diagram of a duplexing circuit which may be employed in the embodiment of FIG. 1.

FIG. 3 illustrates a preferred embodiment of the duplexing circuit 18 together with associated circuit components including the antenna 20 and the ganged selector switches 16-1, 16-2. The duplexing circuit 18 preferably employs non-reciprocal circuit devices, the preferred devices being those referred to as circulators. The circulators are preferably ferrite devices which can be designed for efficient operation at L-band, as well as for other microwave frequencies. A circulator is a non-reciprocal device having the property that a wave sent into any one terminal, or port, circulates around in a predetermined circular direction of rotation as determined by the design of the circulator, and emerges from the next adjacent terminal, or port. In an ideal circulator, all of the entering wave energy emerges from the next adjacent port. In actual circulators, some of the energy continues on around the circulator. However, an attenuation in the order of 25 or more decibels is provided in the energy of the wave which continues around the circulator. In the embodiment of the duplexing circuit 18 shown in FIG. 3, one circulator 72 is provided. The direction of circulation for which the circulator is designed is indicated by an arrow. The direction of circulation is also signified by the numbering of the ports, or terminals. Thus, in the circulator 72, the direction of circulation is from port 1 to port 2 to port 3, etc. A non-reflective matched load 76 is connected to port 3 of the four-port circulator 72. Port 2 of the circulator 72 is connected directly to the antenna 20.

L-band interrogation signals emitted from the transmitter-receiver 10 and available at connection 14 enter at port 1 of circulator 72. In accordance with the rule of operation of the circulator, most of this signal is emitted from port number 2 and thus carried to the antenna 20 for transmission. Any small portion of the L-band interrogation signal energy which does not emerge from port 2 continues around the circulator to port 3 where it emerges and is absorbed by the non-reflective load 76. Thus, the connection 46 from the output of the receiver frequency converter for the C-band signals is effectively isolated from the high-powered outgoing L-band interrogation signals.

C-band DME response signals, which have been converted to L-band, and which appear on connection 46, enter the circulator 72 at port 4. In accordance with the rule of operation of the circulator, these signals emerge from the next adjacent port number 1 and are thus carried on connection 14 to the L-band transmitter-receiver 10. Thus, the desired signal connections for the outgoing L-band interrogation signals, and the incoming converted C-band signals are available. If undesired responses transmitted at L-band are received by antenna 20, they enter the port 2 of circulator 72, and most of the energy emerges from port 3 of that circulator and is absorbed in the matched load 76. Thus, a very substantial attenuation of any unwanted L-band response signal is accomplished in the circulator 72. The attenuation is generally sufficient so that any remaining remnant of the signal reaching the receiver is ignored by the receiver as an invalid signal.

The selector switches 16-1, 16-2 are schematically illustrated as manual switches. However, diode switches are normally used in this circuit at the L-band frequencies which are to be handled. It is also possible to modify the terminations at the circulator 72 ports to provide for a continuation of the circulation of signals rather than to provide for attenuation of those signals, and to thus provide an effective signal path for transmission of L-band signals received by antenna 20 down to the transmitter-receiver connection 14 when desired. However, this modification is not illustrated in detail.

If additional attenuation of the unwanted L-band responses received by antenna 20 is required, then an additional non-reciprocal device can be provided. A preferred embodiment of a duplexing circuit including such an additional non-reciprocal device is illustrated in FIG. 4.

Figure 4:
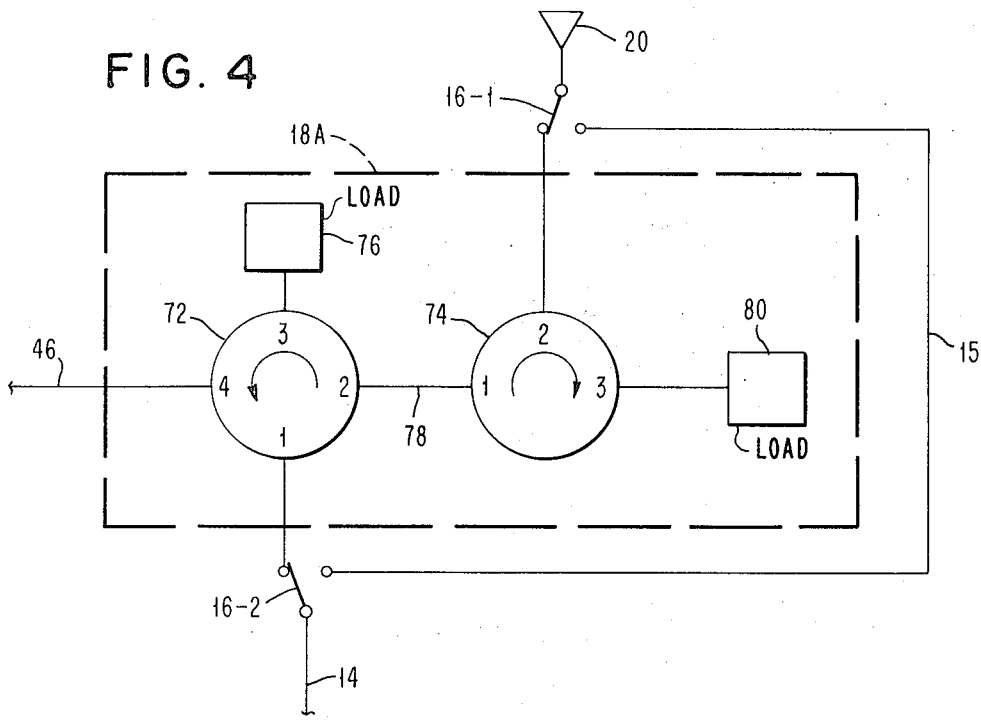
FIG. 4 is an alternative embodiment of the duplexing circuit which may be employed in the circuit of FIG. 1.

FIG. 4 illustrates another embodiment 18A of the duplexing circuit 18 which is very similar to the embodiment of FIG. 3, but incorporating an additional non-reciprocal device in the form of a three port circulator 74 interposed between the port 2 of circulator 72 and the antenna 20. Thus, the port 2 of circulator 72 is interconnected by a connection 78 with port 1 of the three port circulator 74, and port 2 of the circulator 74 is connected to the antenna 20. Port 3 of circulator 74 is connected to a matched non-reflective load 80. The direction of circulation in this circulator is clockwise as illustrated by the arrow, and also as indicated by the numbers of the ports. Outgoing L-band interrogation signals from connection 14 pass through ports 1 and 2 of circulator 72 and appear on connection 78. These signals enter port 1 of circulator 74 and emerge from port 2 of that circulator. Unwanted L-band responses coming back on the antenna 20 enter port 2 of circulator 74 and emrge from port 3 and are absorbed in the load 80. Any fraction of those unwanted signals which continues in the circulator 74 emerges from port 1 and is applied by connection 78 to port 2 of the circulator 72. The major portion of any such energy then emerges from port 3 of circulator 72, as previously described, and is absorbed by the load 76. Thus, in this embodiment of the duplexing circuit, the unwanted L-band responses are attenuated by both of the circulators 74 and 72.

Figure 5:
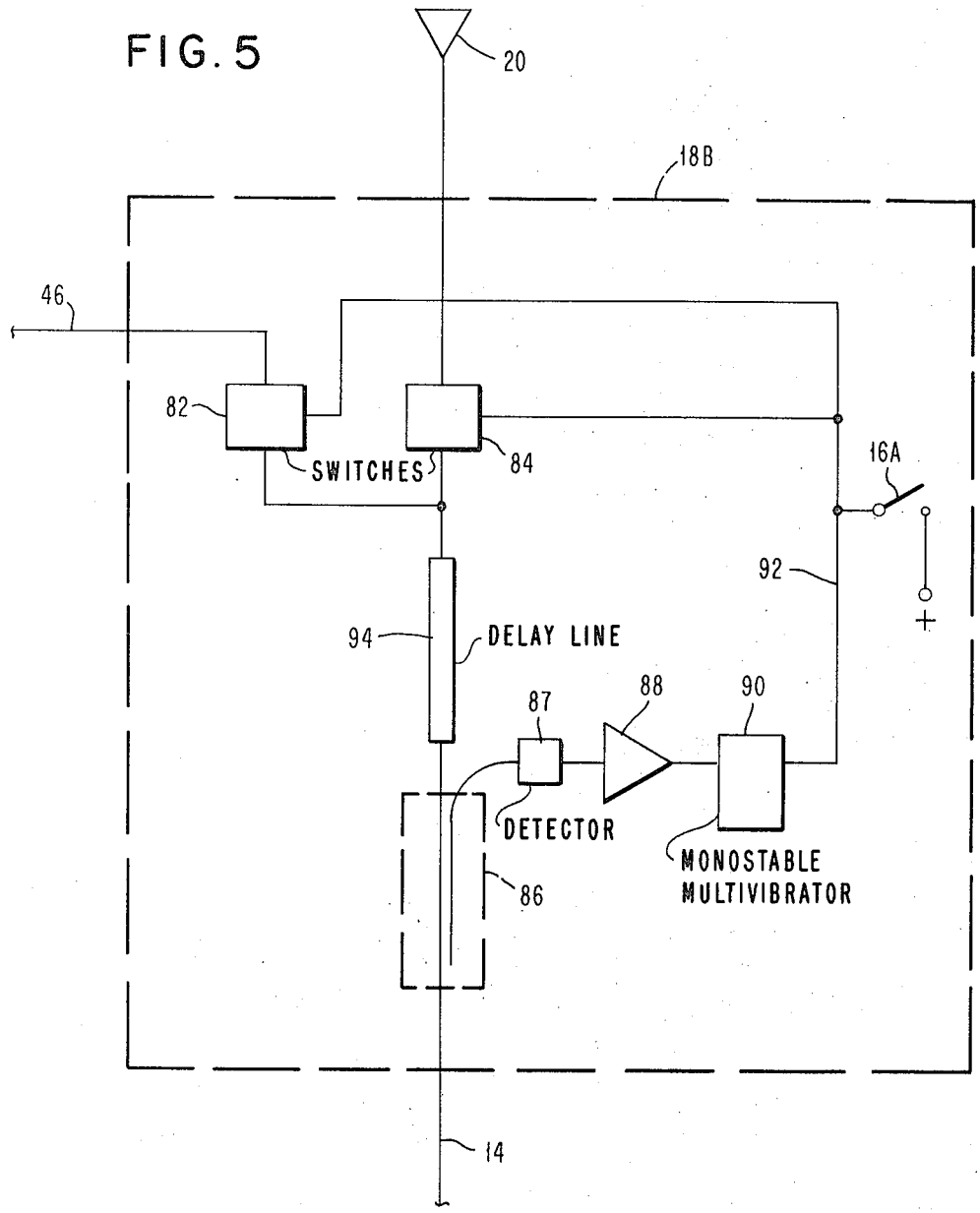
FIG. 5 is a schematic circuit diagram of another alternative embodiment of the duplexing circuit which may be employed in the apparatus of FIG. 1.

FIG. 5 illustrates still another embodiment 18B of the duplexing circuit employing PIN (positive intrinsic negative) microwave switches as the principal elements in accomplishing the duplexing effect. The PIN microwave switches are shown schematically simply as boxes at 82 and 84. The switch 82 is normally closed so as to be effective to receive converted C-band response signals on connection 46 and to transmit such signals through a delay line 94 and a directional coupler 86 to connection 14. The PIN microwave switch 84 is normally open so as to stop undesired response signals transmitted directly in L-band and received by the antenna 20.

However, when a relatively high power outgoing L-band interrogation signal is commenced at the connection 14, its presence is detected by directional coupler device 86 and a detector 87 which direct the coupled portion of the energy to an amplifier 88. The amplified signal from the amplifier 88 is connected to change the state of a monostable multivibrator circuit 90 so as to provide a switching signal on an output connection 92. That signal persists for a predetermined period of time in accordance with the characteristics of the multivibrator circuit 90, the time being sufficient to permit the passage of both of the two pulses or bursts of DME interrogation signal energy. The signal on connection 92 is supplied to both of the PIN microwave switches 82 and 84, changing the switching state of each. Thus, the switch 82 is opened, and the switch 84 is closed. The opening of switch 82 prevents the dissipation of the high-powered L-band interrogation pulses through the connection 46. The closing of switch 84 permits the transmission of those pulses through a delay line 94 and the switch 84 to the antenna 20. The delay line preferably provides a delay of about 100 nanoseconds and serves to assure that the switches 82 and 84 have been changed in state before the arrival of the wave front of the first pulse of L-band interrogation energy which initiates the operation of the amplifier 88 through the directional coupler 86.

In this embodiment, the bypass switches 16-1, 16-2 are dispensed with, since it is only necessary to provide a manually operable switch 16A, as shown, to supply a continuous switching signal to the PIN microwave switches 82 and 84 when full operation at L-band (both transmission and reception at L-band) is desired.

FIGS. 6 and 7 illustrate modifications respectively of the airborne equipment previously illustrated in FIG. 1, and the ground station previously illustrated in FIG. 2. The principle difference in the embodiments of FIGS. 6 and 7 is that provision is made in the airborne equipment for the transmission of L-band interrogation signals with a different predetermined spacing, such as eighteen microseconds, in addition to the standard 12 microsecond spacing. The twelve microsecond spacing is used when L-band responses are expected. However, the different spacing, such as 18 microseconds, is used when C-band responses are expected. The ground station of FIG. 7 includes pulse spacing detection circuits causing the ground station to respond in L-band only when the pulse spacing is at 12 microseconds, and to respond in C-band only when the pulse spacing is at the other predetermined spacing such as 18 microseconds.

Since all existing L-band DME requirements include the feature in the ground station that no response is transmitted at L-band, except in response to interrogation pulses at the standard twelve microsecond spacing, the interrogation signals transmitted at the other spacing, such as 18 microseconds, never elicits any unwanted L-band responses. Accordingly, undesired L-band responses are prevented from being received and processed in the L-band receiver-transmitter 10A by preventing such L-band responses from being transmitted from the ground stations.

The airborne equipment of FIG. 6 is virtually identical to the airborne equipment of FIG. 1 with the following specific exceptions: the delay line 52 within the transmitter-receiver 10 is changed in the transmitter-receiver 10A to a delay line 52A having two selectable taps 58 and 100 which are selectable by a switch 102. The tap 58 is for the purpose of providing the standard L-band twelve microsecond spacing between the interrogation pulses. However, the tap 100 can be selected to provide a different spacing, such as 18 microseconds, between the interrogation pulses when a C-band response is desired. The duplexing circuit 18 of FIG. 1 is replaced in FIG. 6 by a duplexing circuit 18C consisting simply of a directional coupler, and the bypass switch 16 is omitted because it is unnecessary.

The directional coupler included within the duplexing circuit 18C is merely for the purpose of preventing power loss of the outgoing L-band interrogation signals in the connection 46 and the frequency converter 44. Thus, most of the power is delivered to antenna 20. However, the directional coupler 18C permits the converted C-band response signals to be transmitted from converter 44 through the coupler to the connection 14 and thus to the L-band receiver 64.

The ground station of FIG. 7 closely resembles the ground station of FIG. 2. However, the pulse spacing recognition circuit 30, which recognizes the standard pulse spacing of twelve microseconds, causes the actuation of an L-band transmitter 104 which is connected back to the L-band antenna 22 to transmit responses on that antenna. A similar pulse spacing recognition circuit 30A is connected to receive the demodulated and delayed interrogation pulses from the delay circuit 28 on connection 29. The pulse spacing recognition circuit 30A is essentially the same in construction and operation as pulse spacing recognition circuit 30, except that it recognizes the different pulse spacing, such as 18 microseconds, and provides an output on connection 32A to actuate the C-band transmitter 34 to provide C-band response signals back to the airborne equipment of FIG. 6.

While both C-band and L-band response transmitters are illustrated in the ground station apparatus of FIG. 7, it will often be true that responses from a particular ground station will be required in only one of these bands. Accordingly, the L-band transmitter 104 and the associated pulse spacing recognition circuit 30 may typically be omitted from the ground station. However, it is a significant advantage of the embodiment of FIGS. 6 and 7 that unwanted and undesired L-band responses are never generated. Accordingly, there is no impairment of the C-band operation by reason of the presence of the L-band transmitter 104 in the ground station of FIG. 7. Accordingly, in high air traffic density locations, it may be desirable to provide both C-band and L-band DME ground station transmitters, as illustrated in FIG. 7, so that aircraft which are not equipped with C-band DME apparatus can nevertheless use their L-band DME apparatus in conjunction with landing operations, or in the more usual DME function of navigation.

In the aforementioned copending patent application Ser. No. 299,586, frequency allocations are provided within the portion of the C-band from 5,000 MHz to 5,250 MHz for the ILS function. Only the highest and lowest frequencies within that portion of the C-band are utilized. The ILS localizer functions, and frequency stabilization functions are provided in a series of five sub-bands extending from 5,000 MHz up to about 5,029.2 MHz. The ILS glide slope functions are provided in a series of five sub-bands respectively paired with the localizer sub-bands and extending from about 5,221.5 MHz up to 5,250 MHz. Each of the pairs of sub-bands may provide as many as 39 channels of ILS, or preferably a lesser number of 20 channels of ILS. The above mentioned frequency allocations leave unused the frequencies from about 5,029.2 MHz to 5,221.5 MHz, and the DME function frequency allocations are preferably somewhere within that frequency band. Specific frequencies allocated for the DME function may preferably be, for instance, from 5,030 to 5,092. With these frequency allocations, it is possible to provide just as many C-band DME channels as there are ILS channels, the corresponding ILS and DME channels being selected by means of the same selector switches in the airborne unit. Thus, there may be provided in the order of 180 DME channels in this C-band system in accordance with the present invention. However, it is preferred to provide only 20 channels for each of the five sub-bands so that there are nominally one hundred C-band DME channels which are preferably reduced to 96 because of omission of four channels in the high end of the last glide slope sub-band in order to fit that sub-band below 5,250 MHz.

While this invention has been shown and described in connection with particular preferred embodiments, various alterations and modifications will occur to those skilled in the art. Accordingly, the following claims are intended to define the valid scope of this invention over the prior art, and to cover all changes and modifications falling within the true spirit and valid scope of this invention.

I claim:
1. An improved radio distance measuring method comprising the steps of
   transmitting a distance measurement interrogation signal from an aircraft in a channel of a first frequency band,
   receiving said interrogation signal at a ground station, transmitting a response signal from the ground station in a channel of a second frequency band, receiving said second frequency band response signal at the aircraft, converting the second frequency band response signal to a frequency within said first frequency band for processing for the distance measurement determination, and concurrently preventing the utilization of response signals received from ground stations by direct radiation in said first frequency band.

2. A method as claimed in claim 1 wherein
said first frequency band is the L-band,
and said second frequency band is the C-band.

3. A method as claimed in claim 1 wherein
utilization of response signals received from ground stations by direct radiations in said first frequency band is prevented by interposing a duplexing circuit.

4. A method as claimed in claim 1 wherein
the utilization of response signals received from ground stations by direct radiation in said first frequency band is prevented by providing a non-standard interrogation signal from the aircraft in said first frequency band in which said interrogation signal consists of two pulses of carrier energy spaced apart by a non-standard spacing so that the ground stations are prevented from recognizing the interrogation signals as signals calling for direct radiation response signals in said first frequency band.

5. A split-band distance measuring apparatus comprising
airborne equipment including an L-band DME aircraft transmitter operable to transmit DME interrogation signals to a ground station and an L-band receiver for receiving and processing L-band response signals from a ground station and operable to measure distance therewith, a ground station operable to receive the L-band DME interrogation signals, said ground station including a C-band transmitter operable in response to the L-band interrogation signals to transmit DME response signals at a C-band frequency, said airborne equipment including a C-band receiver operable to receive the C-band DME response signals and comprised of frequency conversion means operable to convert the C-band response signals to L-band signals, means connecting said frequency conversion means to said L-band receiver to measure distance with the converted L-band signals, and means to prevent the reception by said L-band receiver of L-band response signals transmitted from a ground station by direct radiation at L-band frequencies.

6. Apparatus as claimed in claim 5 wherein
said means to prevent the reception of direct radiation L-band response signals by the airborne equipment comprises means contained within said L-band aircraft transmitter for causing the L-band interrogation signals to be issued in a plurality of pulses of carrier having a unique spacing so as to prevent L-band response distance measurement equipment ground stations from responding to the interrogation signals to thereby prevent the transmission of direct radiation L-band response signals, said ground station including a C-band transmitter and said ground station being operable only in response to L-band interrogation signals issued in said plurality of pulses of carrier having said unique spacing to transmit DME response signals at C-band frequency.

7. Apparatus as claimed in claim 6 wherein
said ground station includes both a C-band transmitter and an L-band transmitter, said ground station being operable to receive and distinguish both the interrogation signals issued in a plurality of pulses having a unique spacing which is used when C-band responses are desired and L-band interrogation signals issued in a conventional form when L-band responses are desired, said ground station including an L-band response transmitter as well as a C-band response transmitter, said ground station being operable to actuate said L-band response transmitter in response to L-band interrogation signals indicating a request for L-band responses, and said ground station being operable to actuate said C-band transmitter in response to L-band interrogation signals indicating a request for C-band responses.

8. A split-band distance measuring apparatus as claimed in claim 5 wherein
said ground station includes an L-band distance measuring equipment receiver operable to receive distance measurement interrogation signals in the form of two bursts of carrier energy having a predetermined spacing therebetween, said receiver including a directional L-band antenna providing a high signal receptivity in a predetermined direction from which aircraft interrogation signals are expected, a pulse spacing recognition circuit connected to said receiver and operable to detect when said predetermined spacing of said interrogation bursts of carrier have been received by said receiver and to provide an output signal in response thereto, said C-band transmitter being connected to receive the output signal from said pulse spacing recognition circuit and operable to generate distance measurement signal responses at C-band frequencies, a C-band antenna connected to said C-band transmitter and operable to transmit the C-band response signals, said C-band antenna having a directional characteristic to provide substantially stronger transmission of signals in said predetermined direction from which interrogation signals are expected.

9. Apparatus as claimed in claim 8 wherein
there is provided a second pulse spacing recognition circuit operable to respond to a different spacing of transmitted pulses and to provide an output signal therefrom, an L-band transmitter connected to receive and to respond to output signals from said second pulse spacing recognition circuit to provide L-band response signals, said L-band transmitter being connected to said L-band antenna for transmission of said L-band response signals from said L-band antenna.

10. A split-band distance measuring apparatus comprising airborne equipment including an L-band DME aircraft transmitter operable to transmit DME interrogation signals to a ground station and an L-band receiver for receiving and processing L-band response signals from a ground station and operable to measure distance therewith, said airborne equipment also including a C-band receiver operable to receive C-band DME response signals in response to L-band interrogation signals and comprised of frequency conversion means operable to convert the C-band response signals to L-band signals, means connecting said frequency conversion means to said L-band receiver to measure distance with the converted L-band signals, and means to prevent the reception by said L-band receiver of L-band response signals transmitted from a ground station by direct radiation at L-band frequencies.

11. Apparatus as claimed in claim 10 wherein said airborne equipment includes UHF-VHF instrument landing system equipment, said C-band receiver and frequency conversion means comprising means for converting the C-band responses to UHF-VHF frequencies corresponding to the conventional instrument landing system frequency requirements so as to provide for a C-band instrument landing system function by means of said C-band receiver, and a separate frequency converter means connected to further convert DME signals included in the converted C-band signals at instrument landing system frequencies to L-band frequencies for processing by said L-band DME receiver.

12. Apparatus as claimed in claim 10 wherein said means to prevent the reception of direct radiation L-band response signals comprises means contained within said L-band transmitter for causing the L-band interrogation signals to be issued in a plurality of pulses of carrier having a unique spacing different from the spacing used when L-band responses are requested so as to prevent L-band response distance measurement equipment ground stations from responding to the interrogation signals to thereby prevent the transmission of direct radiation L-band response signals.

13. Apparatus as claimed in claim 10 wherein said means to prevent the reception of direct radiation L-band response signals is operable only when C-band response signals are expected, and wherein there is provided a common L-band antenna which is operable for both transmission of L-band interrogation signals and reception of direct radiation L-band response signals, said L-band antenna being connected to said L-band receiver and said L-band transmitter through said connecting means for said frequency conversion means.

14. Apparatus as claimed in claim 13 wherein said connecting means comprises a duplexing circuit which is operable to permit L-band interrogation signals to be fed to said L-band antenna for transmission, and which is operable to block any substantial dissipation of the L-band interrogation signals in said frequency conversion means.

15. Apparatus as claimed in claim 13 wherein said connecting means comprises a duplexing circuit and wherein said means to prevent the reception of direct radiation L-band response signals is combined in said duplexing circuit, said duplexing circuit being operable to at least substantially attenuate direct radiation L-band response signals received at said L-band antenna before any part of the direct radiation L-band response signals reaches said L-band receiver.

16. Apparatus as claimed in claim 15 wherein a circuit means is provided which is operable in conjunction with said duplexing circuit for selectively eliminating the attenuation of direct radiation L-band response signals whenever said direct radiation L-band response signals are desired.

17. Apparatus as claimed in claim 15 wherein said duplexing circuit is operable to block any substantial dissipation of L-band interrogation signals in said frequency conversion means.

18. Apparatus as claimed in claim 17 wherein said duplexing circuit comprises at least one circulator having a first port connected in circuit with a common connection to the output of said L-band transmitter and the input of said L-band receiver and having a second port connected in circuit with said L-band antenna and having a third port connected to a non-reflective matched load and having a fourth port connected to said frequency conversion means, the direction of circulation of said circulator corresponding to the progressive numbering of said first, second, third, and fourth ports.

19. Apparatus as claimed in claim 18 wherein said duplexing circuit further comprises a second circulator connected in circuit between said second port of said first-mentioned circulator and said L-band antenna, said second circulator having a first port connected to said second port of said first-mentioned circulator and a second port connected to said L-band antenna and a third port connected to a non-reflective matched load, the direction of circulation of said second circulator being in the direction of the numbering of said first, second, and third ports.

20. Apparatus as claimed in claim 17 wherein said duplexing circuit comprises a directional coupler operable to detect the initiation of outgoing L-band interrogation signals from said L-band transmitter, a first switching means connected in circuit with said directional coupler and operable in response to the initiation of the outgoing L-band transmission signal to close a circuit from said transmitter to said L-band antenna, a second switching means connected for operation only in response to a signal from said directional coupler for opening a circuit from said frequency conversion means to said transmitter.

21. Apparatus as claimed in claim 20 wherein a monostable multivibrator is connected in circuit between said directional coupler and said first and second switching means for maintaining said first and second switching means in the switched condition for a period of time determined by the operating period of said monostable multivibrator whenever operation is first initiated,
said first and second switching means comprising PIN microwave switches.

* * * * *